US011388147B2

(12) United States Patent
Todd et al.

(10) Patent No.: US 11,388,147 B2
(45) Date of Patent: Jul. 12, 2022

(54) SYSTEM AND METHOD FOR REDIRECTING DATA ACCESS TO LOCAL TRUST MANAGERS VIA AN INDIRECTION LOGIC SERVICE

(71) Applicant: EMC IP Holding Company LLC, Hopkinton, MA (US)

(72) Inventors: Stephen James Todd, North Conway, NH (US); Jason A. Shepherd, Austin, TX (US); Jimmy Doyle Pike, Georgetown, TX (US); Aurelian Dumitru, Round Rock, TX (US); Gaurav Chawla, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 16/777,975

(22) Filed: Jan. 31, 2020

(65) Prior Publication Data

US 2021/0243167 A1    Aug. 5, 2021

(51) Int. Cl.
*H04L 29/06* (2006.01)
*H04L 9/40* (2022.01)

(52) U.S. Cl.
CPC ............ *H04L 63/04* (2013.01); *H04L 63/102* (2013.01)

(58) Field of Classification Search
CPC ............................ H04L 63/04; H04L 63/102
See application file for complete search history.

(56) References Cited

U.S. PATENT DOCUMENTS

| 8,474,032 | B2 | 6/2013 | Fetik |
| 8,959,070 | B2 | 2/2015 | Elbaz |
| 2005/0257045 | A1 | 11/2005 | Bushman |
| 2005/0277403 | A1 | 12/2005 | Schmidt |
| 2015/0356494 | A1 | 12/2015 | Kolesnikov |
| 2015/0363109 | A1 | 12/2015 | Frick |
| 2017/0168730 | A1 | 6/2017 | Chiu et al. |
| 2019/0158594 | A1* | 5/2019 | Shadmon ............. G06F 16/2471 |
| 2020/0120023 | A1* | 4/2020 | Munson .................. H04L 45/04 |
| 2020/0213416 | A1* | 7/2020 | Carrier .................. H04L 63/105 |
| 2020/0244701 | A1* | 7/2020 | Di Domenico ....... H04L 63/104 |
| 2020/0274713 | A1 | 8/2020 | Li |
| 2021/0224093 | A1* | 7/2021 | Fu ....................... G06F 9/45541 |

* cited by examiner

*Primary Examiner* — Joseph P Hirl
*Assistant Examiner* — Chi D Nguy
(74) *Attorney, Agent, or Firm* — Chamberlain, Hrdlicka, White, Williams & Aughtry

(57) ABSTRACT

A method for managing data includes obtaining, by an indirection logic service, a data request for data, wherein the data request specifies a ledger entry, identifying an indirection logic entry stored in the indirection logic service based on the ledger entry, obtaining a selection of trust data from a client, wherein the ledger entry comprises metadata of the trust data, and initiating communication between the client and a local trust manager based on the selection of trust data, wherein the trust data was generated by the local trust manager.

17 Claims, 14 Drawing Sheets

SYSTEM AND METHOD FOR REDIRECTING DATA ACCESS TO LOCAL TRUST MANAGERS VIA AN INDIRECTION LOGIC SERVICE

BACKGROUND

Systems may be configured to obtain information from multiple devices. Traditional approaches to configuring such systems require manual configuration and manual updating as devices from which the system is receiving information change.

SUMMARY

In general, in one aspect, the invention relates to a method for managing data. The method includes obtaining, by an indirection logic service, a data request for data, wherein the data request specifies a ledger entry, identifying an indirection logic entry stored in the indirection logic service based on the ledger entry, obtaining a selection of trust data from a client, wherein the ledger entry comprises metadata of the trust data, and initiating communication between the client and a local trust manager based on the selection of trust data, wherein the trust data was generated by the local trust manager.

In general, in one aspect, the invention relates to a non-transitory computer readable medium that includes computer readable program code, which when executed by a computer processor enables the computer processor to perform a method. The method includes obtaining, by an indirection logic service, a data request for data, wherein the data request specifies a ledger entry, identifying an indirection logic entry stored in the indirection logic service based on the ledger entry, obtaining a selection of trust data from a client, wherein the ledger entry comprises metadata of the trust data, and initiating communication between the client and a local trust manager based on the selection of trust data, wherein the trust data was generated by the local trust manager.

In general, in one aspect, the invention relates to a system that includes a processor and memory that includes instructions, which when executed by the processor, perform a method to perform a method. The method includes obtaining, by an indirection logic service, a data request for data, wherein the data request specifies a ledger entry, identifying an indirection logic entry stored in the indirection logic service based on the ledger entry, obtaining a selection of trust data from a client, wherein the ledger entry comprises metadata of the trust data, and initiating communication between the client and a local trust manager based on the selection of trust data, wherein the trust data was generated by the local trust manager.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing DCF nodes. More specifically, embodiments of the invention include using a data management system to obtain configuration requirements from clients to configure the DCF node. The data management system may generate a data confidence fabric (DCF) configuration file and deploy the DCF configuration file to one or more corresponding DCF nodes.

Further, embodiments of the invention include functionality for configuring node managers of the corresponding DCF nodes in accordance with the obtained DCF configuration file and to process the subsequently received data in accordance with the DCF configuration file.

Further, embodiments of the invention relate to linking DCF nodes in the same DCF and/or across multiple different DCFs in order to leverage the processing capabilities of DCF nodes and different DCFs. More specifically, embodiments of the invention relate to the discovery of DCF nodes in other DCFs, determining whether to use the discovered DCF nodes, and then integrating the DCF nodes into a DCF processing path that includes DCF nodes from different DCFs.

Figure 1A:
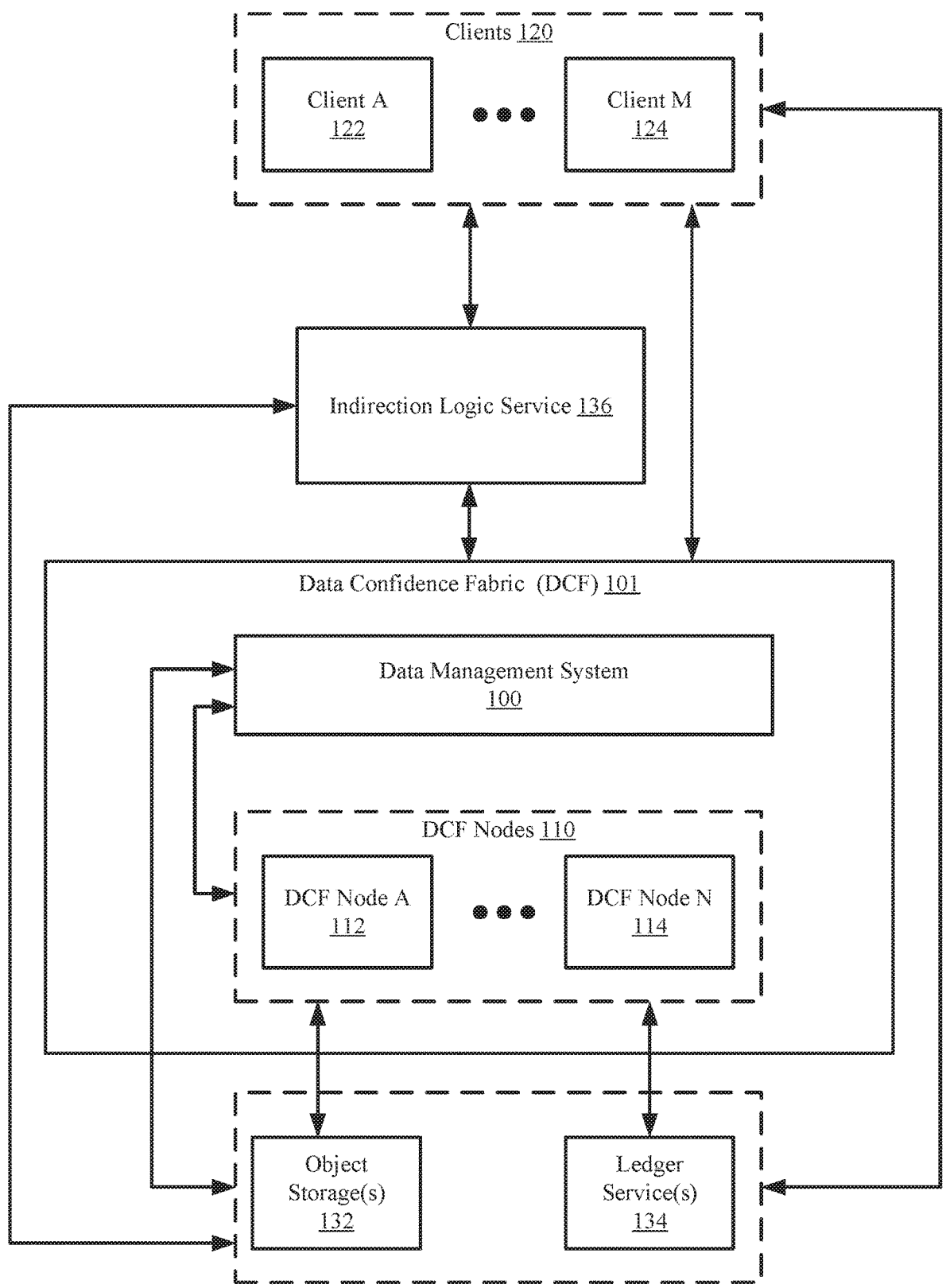
FIG. 1A shows a diagram of a system in accordance with one or more embodiments of the invention.

FIG. 1A shows a diagram of a system in accordance with one or more embodiments of the invention. The system includes data management system (100), DCF nodes (110), clients (120), an object storage (132), a ledger service (134), and an indirection logic service (136). Each component of the system may be operably connected via any combination of wired and/or wireless connections. The system may include additional, fewer, and/or different components without departing from the invention. Each component of the system illustrated in FIG. 1A is discussed below.

In one or more embodiments of the invention, the data management system (100) manages data confidence fabric (101). In one or more embodiments of the invention, data confidence fabric (DCF) is a logical grouping of computing devices configured to store data and provide data to clients (120). In one or more embodiments of the invention, the DCF nodes (110) are part of the DCF.

In one or more embodiments of the invention, the data management system (100) manages the DCF by configuring computing devices associated with the DCF to store data and/or provide data in a way that is requested by the clients (120). The data management system (100) may communicate with the clients by providing the clients a set of options for configuring the DCF computing devices (e.g., the DCF nodes (110)). The data management system may be further equipped to deploy configurations based on a selection of configuration options selected by the clients. For additional details regarding the configuration management of the data management system (100), see, e.g., FIG. 2A.

In one embodiment of the invention, a client is an entity that requests the processing of data obtained by a DCF node using a DCF pipeline (described below). Further, the client may request access to such data after being processed using the DCF pipeline.

In one embodiment of the invention, the data management system also includes functionality to configure DCF processing paths by linking together DCF nodes within the DCF (101) as well as with other DCF nodes in other DCFs (not shown). More specifically, a DCF processing path is a set of DCF nodes that are organized to process data in a specific sequence or order. The DCF processing path may include one or more DCF nodes (see e.g., FIGS. 1C and 1D). Further, the DCF nodes may or may not belong to the same DCF.

Figure 4:
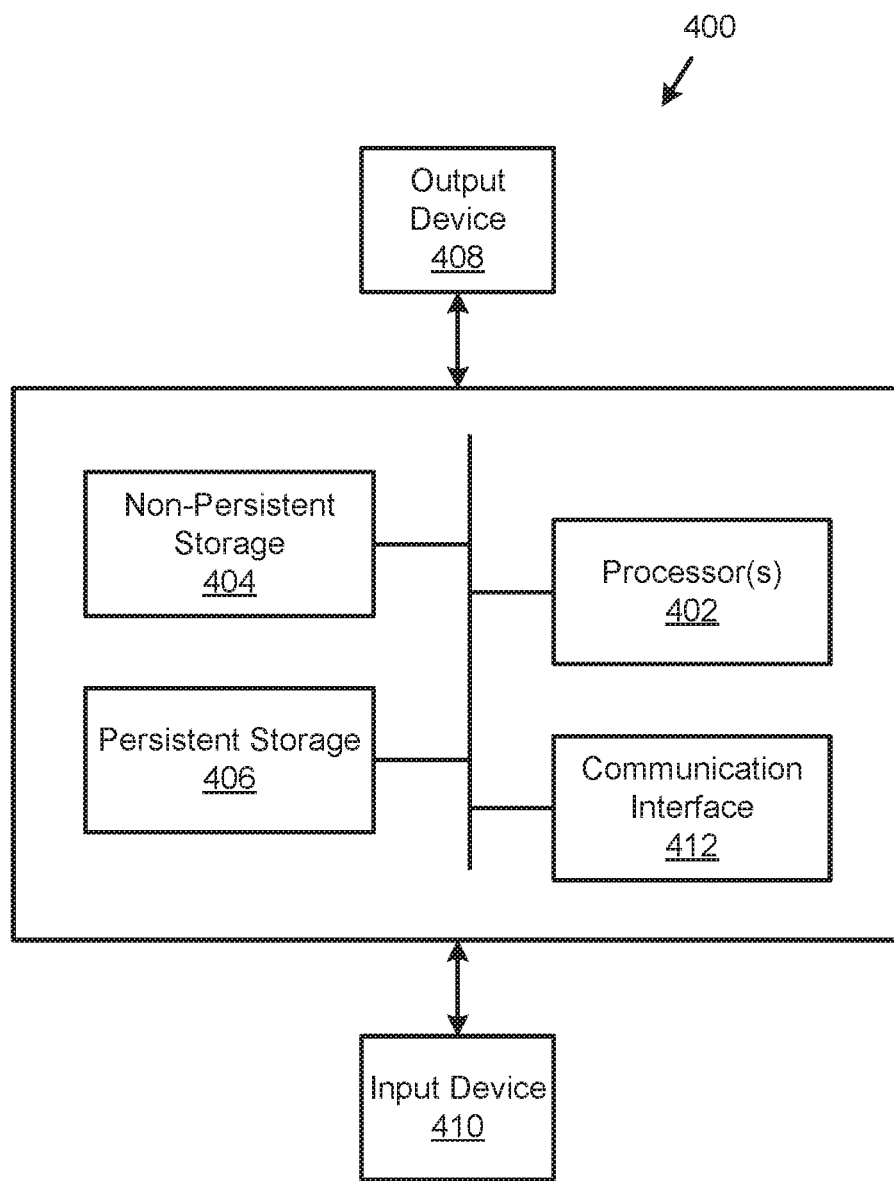
FIG. 4 shows a diagram of a computing device in accordance with one or more embodiments of the invention.

Continuing with the discussion of FIG. 1A, in one or more embodiments of the invention, the data management system (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the data management system (100) described in this application and/or all, or portion, of the method illustrated in FIG. 2A.

The data management system (100) may be implemented as a logical device without departing from the invention. The logical device utilizes computing resources of any number of physical computing devices to provide the functionality of the data management system (100) described throughout this application and/or all, or portion, of the method illustrated in FIG. 2A. For additional details regarding the data management system, see, e.g., FIG. 1B.

In one or more embodiments of the invention, the DCF nodes (110) are systems associated with data confidence fabric that obtains data, stores data, provides data, isolates data, and/or execute applications based on the stored data. The DCF nodes (110) may provide the stored data and/or applications to the clients as specified by terms agreed to by the clients based on transactions between the clients and the DCF nodes (110).

In one or more embodiments of the invention, DCF nodes may be source DCF nodes (see e.g., FIG. 1C) or non-source DCF nodes (see e.g., 1D). Further, the DCF nodes within a given DCF may be organized into one or more DCF processing paths (see e.g., FIG. 3A), which may include remote DCF nodes (see e.g., FIG. 3C). Further, each of the DCF nodes may be associated with one or more DCF processing paths. In one embodiment of the invention, the data management system (100) may include functionality to configure one or more of the DCF nodes (110).

In one or more embodiments of the invention, each DCF node (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the DCF node (110) described throughout this application and/or all, or portion, of the method illustrated in FIG. 2B.

A DCF node (112, 114) may be implemented as a logical device without departing from the invention. The logical device utilizes computing resources of any number of physical computing devices to provide the functionality of the DCF node (112, 114) described throughout this application and/or all, or portion, of the method illustrated in FIGS. 2B-2C. For additional details regarding a DCF node (112, 114), see, e.g., FIGS. 1C-1D.

In one or more embodiments of the invention, the clients (120), via clients executing thereon, may utilize computing resources and/or access data of the DCF nodes (110). The clients executing on the clients (120) may further communicate with the data management system (100) to select configuration options for configuring computing devices of the DCF nodes (110) and provide the options to the data management system (100).

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

In one or more embodiments of the invention, an object storage (132) is a service that stores data and corresponding trust data obtained from the DCF nodes (110). The object storage (132) may be equipped to store immutable entries (i.e., entries that cannot be modified or deleted), where each entry includes an object data identifier (OID) of the data (which may include one or more values) and/or additional trust data of the data. The OID may be a unique identifier generated by performing a function (e.g., a hash function) on data (or a portion thereof) to obtain a unique value (i.e., the object data identifier). The object storage (132) may be internal or external to a DCF node (112, 114) without departing from the invention.

In one or more embodiments of the invention, the additional trust data of an entry may specify additional information about data such as, for example, an owner of the data (e.g., specified using a decentralized identifier (DID)), a geographical location of the data, any cryptographic techniques applied to the data (e.g., digital signatures, encryption keys, compression files, etc.) and/or other information associated with the data without departing from the invention.

In one or more embodiments of the invention, the trust data may be generated by a local trust manager (discussed below) of a DCF node (112, 114) as a result of processing data in the DCF (101). The amount and/or type of trust data generated for data may impact the value of the data according to the clients (120). For example, data with certain trust data (e.g., encryption) may be more valuable to a client (e.g., 122) than data with no trust data. The value of the data may be negotiated with the local trust managers of the DCF nodes (112, 114) when agreeing on terms (discussed below) for accessing the data.

In one or more embodiments of the invention, the object storage (132) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the object storage (132) described throughout this application.

In one or more embodiments of the invention, the object storage (132) is implemented as a logical device. The logical device may utilize computing resources of any number of physical computing devices to provide the functionality of the object storage (132) described throughout this application.

In one or more embodiments of the invention, a ledger service (134) is a service that stores data and/or metadata obtained from the DCF nodes (110). The ledger service (134) may be equipped to store immutable entries, where each entry includes data and/or the metadata of the data. The ledger service may be internal or external to a DCF node (112, 114) without departing from the invention. In scenarios in which the entries do not include the data (or where the data is otherwise not stored in the ledger service), the entries may include a reference to the data (e.g., a reference to a location in the object storage and/or a reference to a location in the node manager).

The ledger service may differ from the object storage (132) in that the ledger service (134) is equipped to implement security measures for the immutable entries. The security measures may include, for example, using private key decryption, peer validation (e.g., using third-party computing devices to validate the entries), etc. Other security measures may be implemented on the immutable entries of the ledger service (134) without departing from the invention.

The ledger service (134) may further differ from the object storage (132) by storing a limited amount of data. Said another way, each entry of the ledger service (134) may use less data than the object storage such that the total amount of data stored in the ledger service (134) is less than that of the object storage (132). For example, a ledger entry of the ledger service (134) may store a hash value of the data stored in an entry of the object storage (132). As a second example, a ledger entry may store metadata of the data and/or trust data stored in an object entry of the object storage (132).

In one or more embodiments of the invention, the ledger service (134) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the ledger service (134) described throughout this application.

In one or more embodiments of the invention, the ledger service (134) is implemented as a logical device. The logical device may utilize computing resources of any number of physical computing devices to provide the functionality of the ledger service (134) described throughout this application.

In one or more embodiments of the invention, the ledger service (134) is implemented as a distributed ledger (e.g., a block chain). The logical device may utilize computing resources of any number of physical computing devices to provide the functionality of the ledger service (134) described throughout this application. For additional details regarding the ledger service, see, e.g., FIG. 1E.

In one or more embodiments of the invention, the indirection logic service (136) stores entries based on the ledger entries stored in the ledger service (134). Specifically, the indirection logic service (136) stores entries that specify the local trust managers (discussed below) that generate the trust data stored in the object storage or stored in the DCF nodes (110). The indirection logic entries may further include pointers that enable communication between the clients (120) that want to access the data and the DCF nodes (110) that generated the trust data associated with such data. The communication may include negotiating terms for access of the data and/or any portions of the trust data generated for the data. The terms may include paying, by a client (122, 124), an agreed price to the DCF nodes (112, 114) and/or to an operator of the DCF nodes (e.g., via a secondary computing device) for the access to such data and/or trust data. The indirection logic service may further include functionality to process data requests in accordance with the method illustrated in FIG. 2D.

In one or more embodiments of the invention, the communication between the DCF nodes (110) and the clients (120), as initiated by the indirection logic service (136), includes participating in any type of distributed transaction ledger, e.g., blockchain based transaction, to complete the acceptance of the terms. A distributed transaction ledger may be a program executed by the indirection logic service (136) and/or other entities in the system of FIG. 1A that creates a record of and/or enforces agreed upon transactions. The record generated by the distributed transaction ledger may be a data structure that is distributed across any number of entities which creates an immutable record of each transaction processed by the distributed transaction ledger. The indirection logic service (136), or other entities, may complete transactions via methods other than participation in a distributed transaction ledger without departing from the invention.

In one or more embodiments of the invention, the indirection logic (136), or other such entities, facilitates transactions using smart contracts. A smart contract may be a program executing via a distributed transaction ledger that facilitates the exchange of a currency (e.g., bitcoins) supported by the distributed transaction ledger. Upon execution of a smart contract, the smart contract may automatically exchange the currency and any access information between the parties that entered into the smart contract.

In one or more embodiments of the invention, the indirection logic service (136) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the indirection logic service (136) described throughout this application.

In one or more embodiments of the invention, the indirection logic service (136) is implemented as a logical device. The logical device may utilize computing resources of any number of physical computing devices to provide the functionality of the indirection logic service (136) described throughout this application.

In one or more embodiments of the invention, the indirection logic service (136) is implemented as a distributed ledger (e.g., a block chain). The logical device may utilize computing resources of any number of physical computing devices to provide the functionality of the indirection logic service (136) described throughout this application. For additional details regarding the indirection logic service (136), see, e.g., FIG. 1F.

Figure 1B:
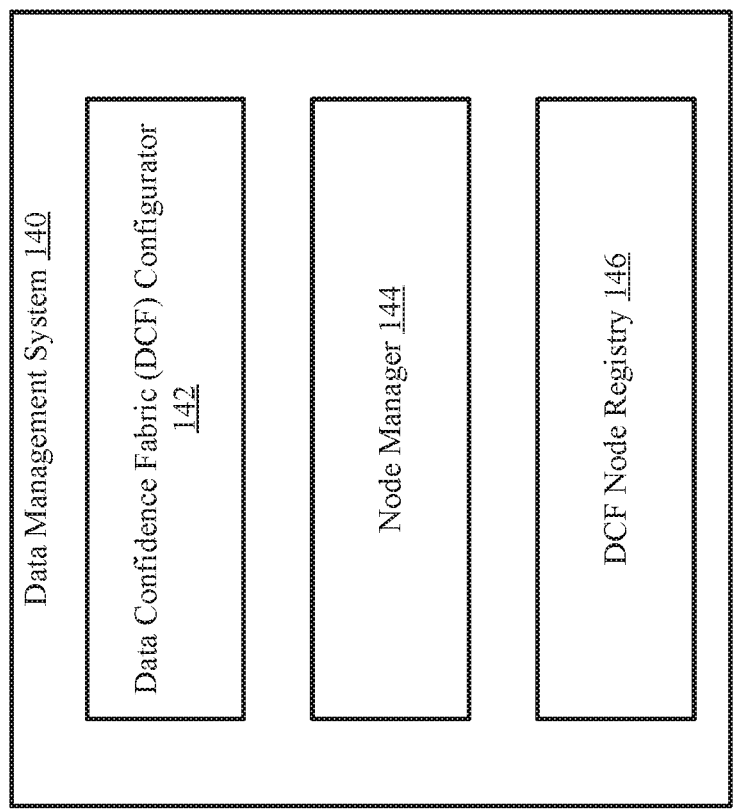
FIG. 1B shows a diagram of data management system in accordance with one or more embodiments of the invention.

FIG. 1B shows a diagram of data management system in accordance with one or more embodiments of the invention. The data management system (140) may be an embodiment of the data management system (100, FIG. 1A) discussed above. As discussed above, the data management system (140) communicates with clients to obtain a selection of configuration options and uses the selection to generate DCF configuration files to be deployed to one or more DCF nodes.

To perform the aforementioned functionality, the data management system (140) includes data confidence fabric (DCF) configurator (142), a node manager (144), and a DCF node registry (146). The DCF configurator (142), a node manager (144), and the node registry (146) may be operably connected via any combination of wired and/or wireless networks without departing from the invention. The data management system (140) may include additional, fewer, and/or different components without departing from the invention. Each of the aforementioned components is discussed below.

In one or more embodiments of the invention, the DCF configurator (142) communicates with the clients to present options for configuring one or more DCF nodes. The options may be presented via a graphical user interface (GUI). The DCF configurator may send the options to a client (on which the clients are executing) to be displayed by the GUI operating in the client.

In one or more embodiments of the invention, the options (also referred to as configuration options) specify configurations to be implemented on node managers of the DCF nodes. The configurations may specify options for augmenting unprocessed data and/or modifying the unprocessed data to generate processed data, options for storing the data (either processed data or unprocessed data) and/or options for isolating the generated data from other clients. The configurations may be associated with a DCF pipeline in which the data is obtained and/or stored. In one or more embodiments of the invention, a DCF pipeline is a process (which may include multiple processing steps) to be performed by a node manager when obtaining and/or storing unprocessed data. In one embodiment of invention, the DCF configuration (142) may also provide the clients with the ability to specify a DCF processing path from a set of DCF nodes, which may include, source DCF nodes, non-source DCF nodes, and remote DCF nodes (which may be either source DCF nodes or non-source DCF nodes in other DCFs). For example, the client may specify the DCF nodes (including remote DCF nodes) and the order in which the DCF nodes are to process the data. Accordingly, the client may be able to specify a DCF processing path. Further, for each DCF node in the processing path, the client may be able to specify the specific processing that is to be performed. The specific processing that is performed on a given DCF node may be referred to as a DCF pipeline. Thus, a DCF processing path may specify the set of DCF pipelines that are to be used to process the data.

The following discussion describes the configuration of a DCF pipeline on a given DCF node, which may then be combined with the DCF pipelines of other DCF nodes to generate the DCF processing path.

Turning the configuration options of the DCF pipeline, in one or more embodiments of the invention, the GUI may specify options for augmenting the unprocessed data. In one or more embodiments of the invention, the unprocessed data is augmented by generating additional data to be embedded in the unprocessed data prior to storage. The additional data may be, for example, metadata, digital signatures, identification information, etc.

In one or more embodiments of the invention, the metadata includes characteristics that may be useful to a computing device obtaining the data to determine a reliability of the data. The characteristics may include, for example, a data identifier (e.g., a combination of letters, characters, and/or numbers that uniquely identify the processed or unprocessed data), a geographical location associated with the data, a type of data (e.g., temperature measurements, recorded video, speedometer data, etc.), data source identifier (e.g., a combination of letters, characters, and/or numbers that uniquely identify a local data source from which the unprocessed data was obtained), etc. A client may specify, e.g., using the GUI, which, if any, of the characteristics should be generated and/or embedded into (or otherwise associated with) the unprocessed data.

In one or more embodiments of the invention, the identification information specifies ownership of the data. The owner of the data may be a legal entity that has the right to store, obtain, use, and/or profit from the data. A legal entity may be a person, a group of people, a partnership, corporation, any other business entity, or any combination thereof. The client may specify, e.g., using the GUI, whether the identification information should be generated and/or embedded into (or otherwise associated with) the unprocessed data. The identity of the owner may be specified using the DID for the owner.

In one or more embodiments of the invention, a digital signature of unprocessed data is data that is generated using a private key and the unprocessed data. The digital signature may be generated, for example, by performing a function (e.g., a hash function) on the unprocessed data to generate a value, and performing a secondary function (e.g., encryption) on the value using the private key. The client may specify, e.g., using the GUI, whether a digital signature should be generated and/or embedded into (or otherwise associated with) the unprocessed data. The public-private key pair may be associated with the owner, where the data is signed using the private key of the owner of the data (also referred to as an object(s)).

In one or more embodiments of the invention, the GUI specifies options for modifying the unprocessed data. The data may be modified by, for example, performing an encryption and/or performing compression on the unprocessed or processed data prior to storing the data. In one or more embodiments of the invention, performing compression on unprocessed data includes applying a compression algorithm on the unprocessed data to generate processed data such that the processed data includes less data than the unprocessed data. The client may specify, e.g., using the GUI, whether to modify the data prior to storage and/or the type of modification to perform (e.g., encryption, compression, etc.).

In one or more embodiments of the invention, the GUI specifies options for storing the data. The data may be stored internally in the DCF node (e.g., in a persistent storage of the node manager) and/or externally. For example, the data (processed or unprocessed) may be replicated and stored in a ledger service. In such embodiments, the data (processed or unprocessed) may be stored by generating a ledger entry and storing the data and/or any metadata associated with the data in the ledger entry to be stored in the ledger service. The metadata associated with the data (processed or unprocessed) may further be stored in an object storage. The ledger entry may be used by, e.g., clients for auditing purposes.

In one or more embodiments of the invention, the client specifies, using the GUI, options for storing the processed or unprocessed data and/or any metadata associated with the processed or unprocessed data. The options may include storing the data in a ledger service and/or storing the metadata (if any) in an object storage.

In one or more embodiments of the invention, the GUI specifies options for isolating processed and/or unprocessed data. Specifically, the client may specify that the processed and/or unprocessed data is to be stored in a location in the persistent storage that is not accessible to other clients or in a persistent storage that is physically separate from the persistent storage used to stored process and/or unprocessed data associated with other clients. Further, the client may also specify that the processed and/or unprocessed data is to be transmitted to the persistent storage, the object storage, and/or to any other external storage location via its own communication channel (i.e., a communication channel that is not used to transmit processed and/or unprocessed data associated with any other client). The isolated communicated channel may be implemented using, e.g., a virtual private network, or any other network (or communication) protocol that isolates network traffic. In addition, the unprocessed and/or processed data may be isolated from other clients using, e.g., encryption. Other methods for isolating the processed and/or unprocessed data may be used without departing from the invention.

The invention is not limited to aforementioned options from which the user may select via a GUI. Moreover, while the options may be selected using a GUI, the options may be selected using any other selection mechanism (now or later discovered) without departing from the invention. For example, the options may be provided using a command line interface, an application programming interface(s) (API)(s), or any other mechanism for providing options to the clients and/or for receiving the selections from the clients.

In one or more embodiments of the invention, the DCF configurator (142) generates a DCF configuration file based on the selection of options obtained from the client. The DCF configuration file may include options selected by the user for a given DCF node. In addition, if the DCF node is part of a DCF processing path, then the DCF configuration file may include information about the other DCF nodes in the DCF processing path and information (e.g., IP addresses) about how to access or communicate with such other DCF nodes in the DCF processing path. For additional details regarding the generation of the DCF configuration file, see, e.g., FIG. 2A.

In one or more embodiments of the invention, DCF configurator (142) is a hardware device including circuitry. The DCF configurator (142) may be, for example, a digital signal processor, a field programmable gate array, or an application specific integrated circuit. The DCF configurator (142) may be other types of hardware devices without departing from the invention.

In one or more embodiments of the invention, the DCF configurator (142) is implemented as computing code stored on a persistent storage that when executed by a processor of the data management system (140) performs the functionality of the DCF configurator (142). The processor may be a hardware processor including circuitry such as, for example, a central processing unit or a microcontroller. The processor may be other types of hardware devices for processing digital information without departing from the invention.

In one or more embodiments of the invention, the node manager (144) interfaces with DCF nodes to configure one or more DCF nodes (which may include remote DCF nodes that are permitted to be integrated into a DCF processing path). Specifically, the node manager (144) deploys DCF configuration files generated by the DCF configurator (142). The node manager (144) may identify the node managers to which to send the DCF configuration files and subsequently send the DCF configuration files to the identified node managers.

In one or more embodiments of the invention, node manager (144) is a hardware device including circuitry. The node manager (144) may be, for example, a digital signal processor, a field programmable gate array, or an application specific integrated circuit. The node manager (144) may be other types of hardware devices without departing from the invention.

In one or more embodiments of the invention, the node manager (144) is implemented as computing code stored on a persistent storage that when executed by a processor of the data management system (140) performs the functionality of the node manager (144). The processor may be a hardware processor including circuitry such as, for example, a central processing unit or a microcontroller. The processor may be other types of hardware devices for processing digital information without departing from the invention.

In one embodiment of the invention, the DCF node registry (146) lists all DCF nodes in the DCF (i.e., the DCF that is managed by the management data system). Each entry in the DCF node registry may specify: (i) a DCF node identifier; (ii) an IP address (or other information) that may be used to access DCF node; and (iii) the type of processing or other capabilities of the DCF node. The capabilities of the DCF node may be a subset of the capabilities of the DCF node. The entries in the DCF node registry may include additional or different information without departing from the invention.

The data management system (or an administrator or other user of the data management system) may determine which DCF nodes to include on the DCF node registry as well as determine which capabilities of the DCF nodes to specify in the DCF node registry.

The DCF node registry (146) may be implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the DCF node registry (146) described in this application.

The DCF node registry (146) may each be implemented as a logical device without departing from the invention. The logical device utilizes computing resources of any number of physical computing devices to provide the functionality of the DCF node registry (146) described throughout this application.

Figure 1C:
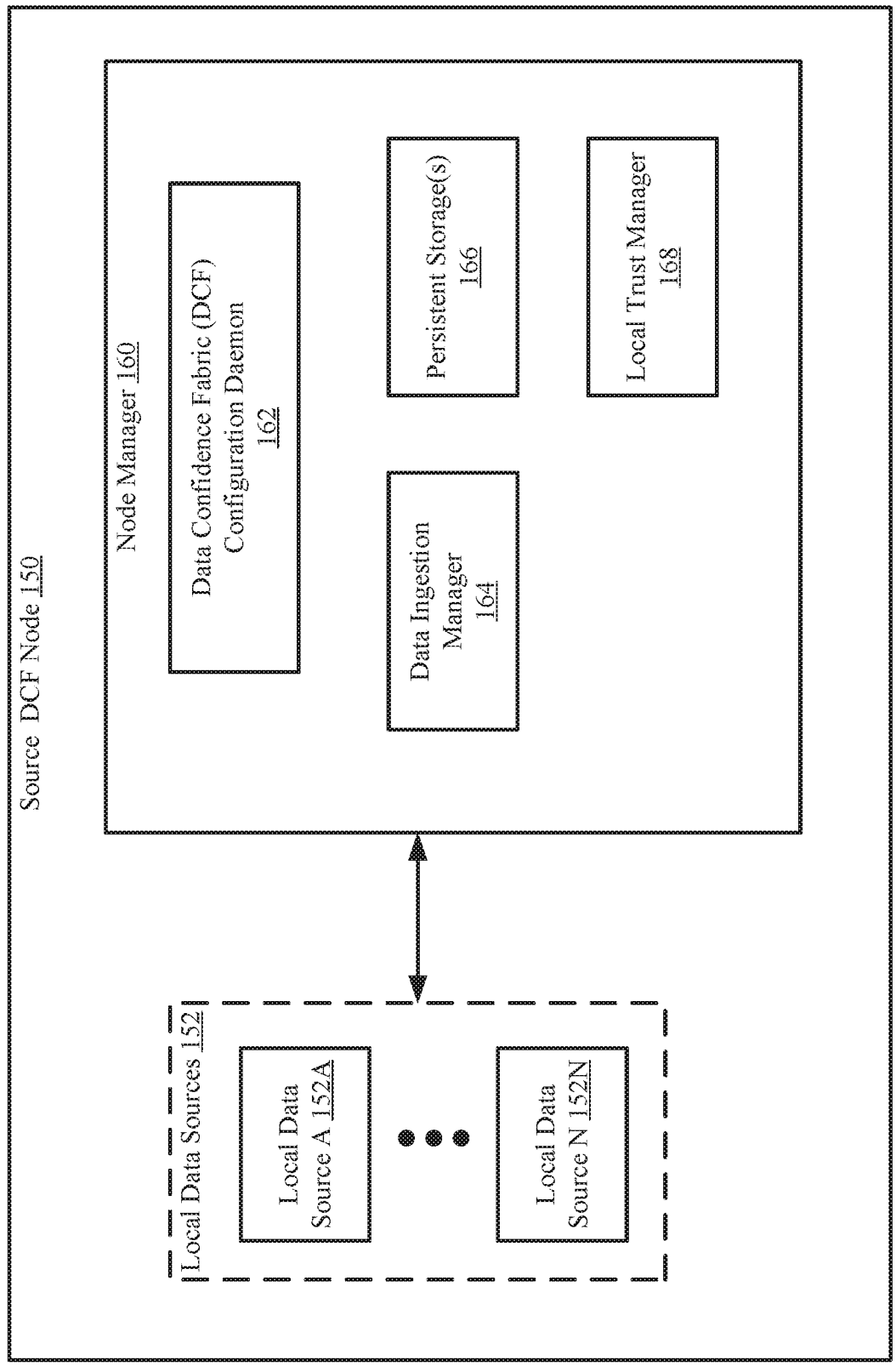
FIG. 1C shows a diagram of a source DCF node in accordance with one or more embodiments of the invention.

FIG. 1C shows a diagram of a source DCF node in accordance with one or more embodiments of the invention. The Source DCF node (150) may include local data sources (152) and a node manager (160). The Source DCF node (150) may include additional, fewer, and/or different components without departing from the invention. Each component of the Source DCF node (150) illustrated in FIG. 1C is discussed below.

In one or more embodiments of the invention, the local data sources (152) are sources of data obtained from real-world processes. Data source may be, for example, a sensor. The sensor may be a hardware device for supplying data regarding a real-world process. For example, the sensor may be a count sensor that determines the number of items that are present in a particular location. The count sensor may supply the number of items to a database that stores the information on behalf of the count sensor. The sensor may be other types of sensors (e.g., distance sensors, temperature sensors, cameras, audio sensors, etc.) without departing from the invention.

In one or more embodiments of the invention, at least one of the local data sources (152A, 152N) is an Internet-of-things (IOT) device. For example, one of the data sources (152A) may be a camera operably connected to the Internet and that supplies data via an IOT standard to the node manager (160). The data may be a video stream of a particular location. Image recognition may be utilized to extract relevant information from the video stream. The relevant information may be supplied to the node manager (160) in isolation or in combination with the video stream itself.

In one or more embodiments of the invention, the node manager (160) is a device (e.g., a computing device as shown in FIG. 4) that manages data obtained from the local data sources (152). The node manager (160) may manage the data by storing the data in internal storage (e.g., persistent storage (166)) or external storage and/or providing the data to external entities (e.g., clients). The node manager (160) includes a DCF configuration daemon (162), data ingestion manager (164), persistent storage (166), and a local trust manager (168). The node manager may include additional, fewer, and/or different components without departing from the invention.

In one or more embodiments of the invention, the DCF configuration daemon (162) manages the configuration of components of the local data manager (160). Specifically, the DCF configuration daemon (162) configures the data ingestion manager (164) based on a DCF configuration file(s) obtained from a data management system. The DCF configuration daemon (162) may configure the data ingestion manager (164) in accordance with the method of FIG. 2B. The DCF configuration daemon may configure the data ingestion manager (164), or other components of the node manager (160), via other methods without departing from the invention.

In one or more embodiments of the invention, the DCF configuration daemon (162) is implemented as computing code stored on a persistent storage (e.g., 166) that when executed by a processor of the node manager (160) performs the functionality of the DCF configuration daemon (162). The processor may be a hardware processor including circuitry such as, for example, a central processing unit or a microcontroller. The processor may be other types of hardware devices for processing digital information without departing from the invention.

In one or more embodiments of the invention, the data ingestion manager (164) manages how unprocessed data is obtained (also referred to as ingested) from the local data sources (152). The data ingestion manager (164) may process the unprocessed data to generate processed data store the processed data in accordance with a DCF pipeline. The processed data may include individual values and/or sets of values. The DCF pipeline may be specified by a DCF configuration file used by the DCF configuration daemon to configure the data ingestion manager (164). In one embodiment of the invention, the data ingestion manager (164) may have stored thereon or have access to the private key of the owner (as described above). The data ingestion manager (164) may use the private key to sign the data (or portions thereof) and/or encrypt the data.

In one embodiment of the invention, the node manager (160) may receive multiple DCF configuration files. Each of these DCF configuration files may specify a different DCF pipeline.

In one or more embodiment of the invention, and as discussed above, the DCF configuration files may include information about a DCF processing path of which the source DCF node is a part. In such scenarios, the DCF configuration file may include information about the next DCF node in the processing path (i.e., the next DCF node that is going to process the data after the DCF node (150)).

While FIG. 1C shows the DCF node (150) obtaining data from local data sources, the DCF node may also be able to obtain data from other source DCF nodes and non-source DCF nodes (which may or may not be remote DCF nodes).

The persistent storage (166) may be configured to store data. The data may be processed data or unprocessed data. The persistent storage (166) may be a physical storage. For example, the persistent storage (166) may include hard disk drives, solid state drives, and/or tape drives for storing data. The persistent storage (166) may include other types of non-transitory storage mediums without departing from the invention.

In one or more embodiments of the invention, the persistent storage (166) stores data obtained from the local data sources (152). The data stored in the persistent storage (166) may be provided to clients with which the data is associated, i.e., the client associated with the DCF pipeline that processed and ultimately caused the data to be stored in the persistent storage.

In one embodiment of the invention, the local trust manager (168) includes functionality to generate trust data. The trust data may be generated in accordance with a DCF pipeline as configured and/or implemented by the node manager (160). The trust data may be stored in the persistent storage (166). The local trust manager (168) may further include functionality to generate ledger entries and/or update generated ledger entries stored in the ledger service (e.g., 134, FIG. 1A) discussed above. The ledger entries (further discussed below) may include metadata for the object data generated by and/or processed by one or more DCF nodes and metadata corresponding to the trust data generated by the local trust manager (168) for the object data.

Figure 1D:
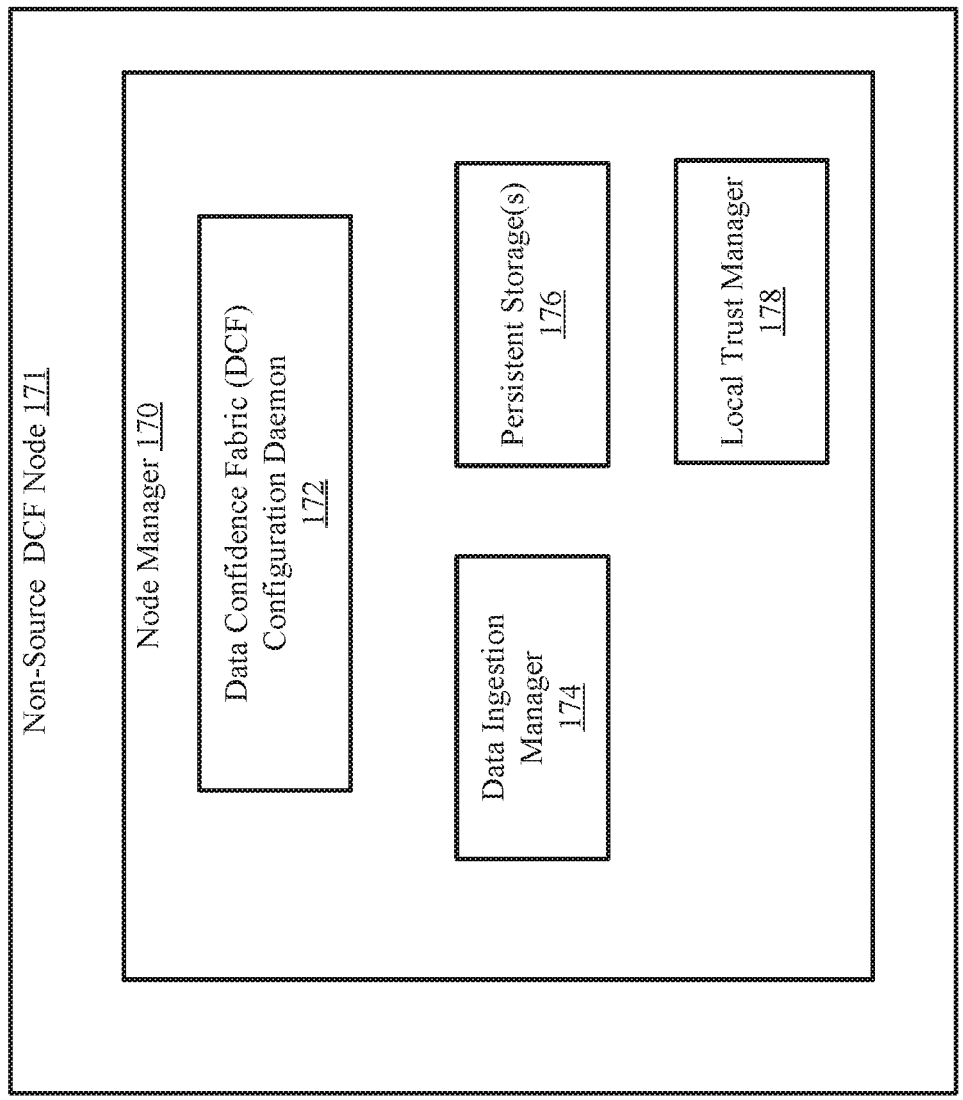
FIG. 1D shows a diagram of a non-source DCF node in accordance with one or more embodiments of the invention.

FIG. 1D shows a diagram of a non-source DCF node in accordance with one or more embodiments of the invention. The non-source DCF node (171) in FIG. 1D operates in manner that is substantially similar to the source DCF node (150, FIG. 1C) except that the non-source DCF node (171) is only able to receive data from source DCF nodes or non-source DCF nodes. Said another way, while source DCF nodes obtain data directly from local data sources, the non-source DCF nodes are only able to obtain data indirectly via source DCF nodes and/or non-source DCF nodes.

In one embodiment of the invention, the node manager (170) operates in a substantially similar manner to node manager (160, FIG. 1C). Further, DCF configuration daemon (172) operates in a substantially similar manner to DCF configuration daemon (162, FIG. 1C), data ingestion manager (174) operates in a substantially similar manner to data ingestion manager (164, FIG. 1C), persistent storage (176) operates in a substantially similar manner to persistent storage (166, FIG. 1C), and the local trust manager (178) operates in a substantially similar manner to local trust manager (168, FIG. 1C).

Figure 1E:
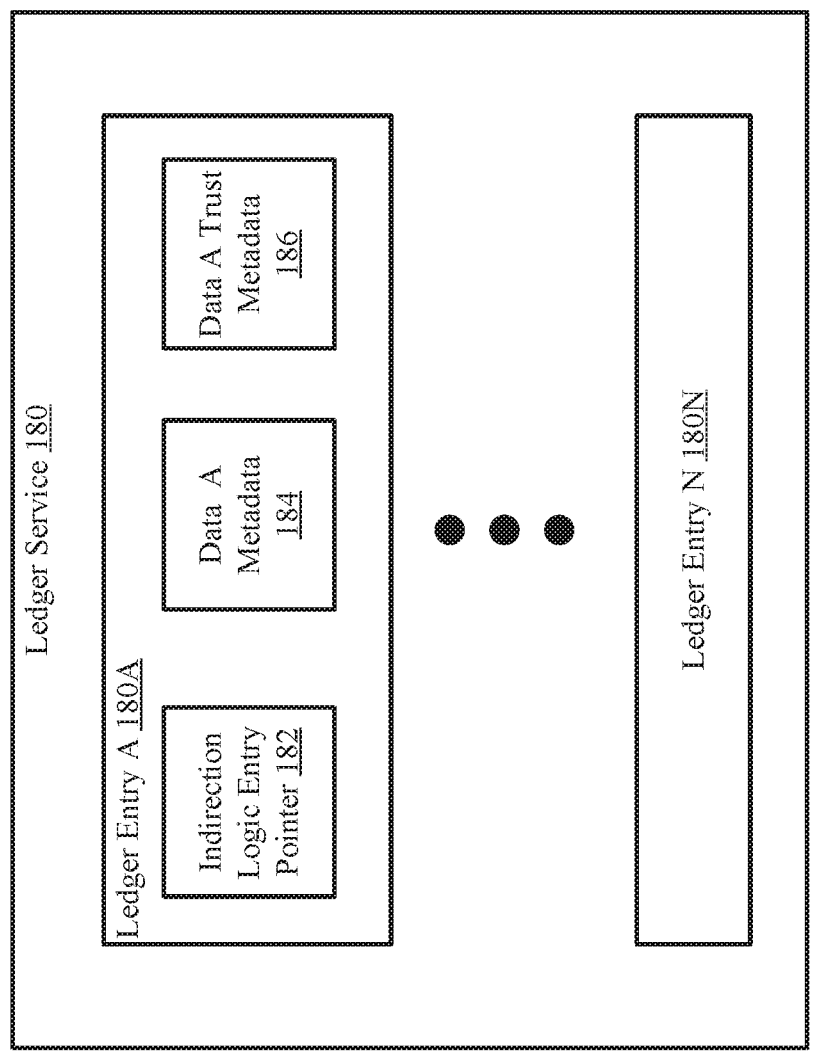
FIG. 1E shows a diagram of a ledger service in accordance with one or more embodiments of the invention.

FIG. 1E shows a diagram of a ledger service in accordance with one or more embodiments of the invention. The ledger service (180) in FIG. 1E may be an embodiment of the ledger service (134) discussed above. As discussed above, the ledger service (180) stores data. The data may be references to data stored in an object storage. The ledger service (180) may include ledger entries (180A, 180N) that are each associated with data stored in the object storage(s) of FIG. 1A. Each ledger entry (180A, 180N) may include an indirection logic entry pointer (182), data metadata (184), and data trust metadata (186). The ledger entries (180A, 180N) may include additional, fewer, and/or different components without departing from the invention. Each component of a ledger entry (180A, 180N) illustrated in FIG. 1E is discussed below.

Figure 1F:
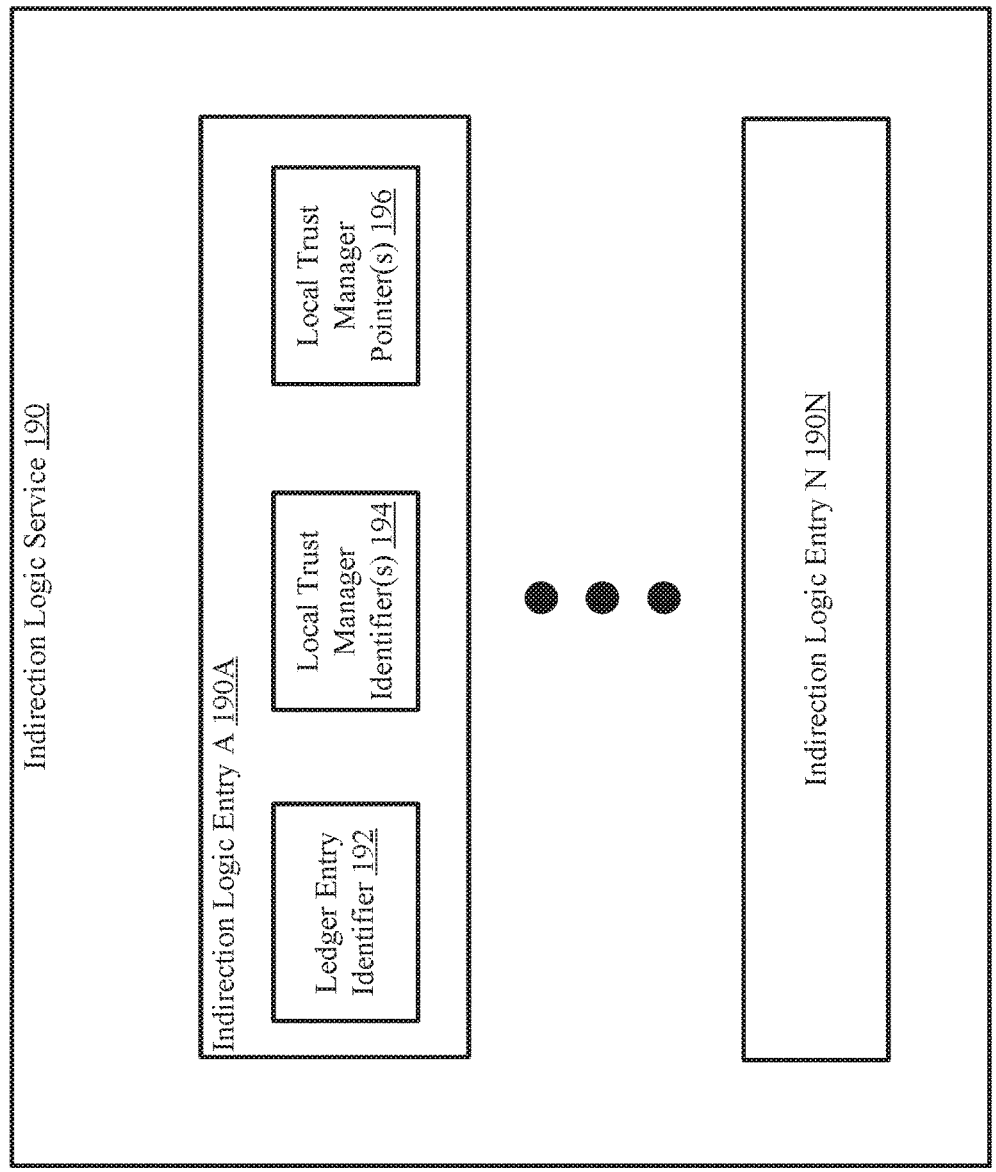
FIG. 1F shows a diagram of an indirection logic service in accordance with one or more embodiments of the invention.

In one or more embodiments of the invention, the indirection logic entry pointer (182) is a reference to an indirection logic entry stored in the indirection logic service of FIG. 1A, see e.g., FIG. 1F. The indirection logic entry may be accessed via the indirection logic entry pointer (182). The indirection logic entry pointer (182) may include a universal resource locator (URL) that redirects a client to the indirection logic service and/or to a specific indirection logic entry in the indirection logic service. The indirection logic entry pointer may specify other unique attributes about the indirection logic entry that enables a client to access the indirection logic entry without departing from the invention. While the indirection logic entry pointer (182) is described as including a URL (e.g., a URL to the indirection logic service), the indirection logic entry pointer may include additional and/or different information and/or utilize a different mechanism to redirect the client to the indirection logic service.

In one or more embodiments of the invention, the indirection logic entry pointer (182) enables a client browsing the ledger service (180) to access the indirection logic entry associated with the ledger entry (180A, 180N).

In one or more embodiments of the invention, the data metadata (184) specifies the type of data of the associated data and the OID for the data. For example, the data may be temperature readings of a specified geographical location. The data metadata may specify the geographical location and the fact that it is temperature data. The data metadata may specify different or additional information about the associated data without departing from the invention.

In one or more embodiments of the invention, the data trust metadata (186) specifies the type of trust data that was used to process the data. For example, as a DCF pipeline is implemented on data, different trust data (e.g., encryption, compression) may be generated for the data and stored either in the DCF data nodes or in the object storage. The data trust metadata may specify the type (e.g, encryption, compression) of such trust data.

In one or more embodiments of the invention, each ledger entry (180A, 180N) is unique to a DCF configuration path in which data is processed. In one or more embodiments of the invention, after data is processed in accordance with a DCF pipeline, the ledger entry is generated.

FIG. 1F shows a diagram of an indirection logic service in accordance with one or more embodiments of the invention. The indirection logic service (190) in FIG. 1F may be an embodiment of the indirection logic service (136) discussed above. As discussed above, the indirection logic service (190) stores indirection logic entries (190A, 190N). Each indirection logic entry (190A, 190N) is associated with a ledger entry of the ledger service (180, FIG. 1E) discussed above. Each indirection logic entry (190A, 190N) may include a ledger entry identifier (192), one or more local trust manager identifiers (194), and local trust manager pointer(s) (196). The indirection logic entries (190A, 190N) may include additional, fewer, and/or different components without departing from the invention. Each component of an indirection logic entry (190A, 190N) illustrated in FIG. 1F is discussed below.

In one or more embodiments of the invention, the ledger entry identifier (192) specifies the associated ledger entry. As discussed above, each ledger entry may include a pointer that references an indirection logic entry (e.g., 190A). The ledger entry identifier (192) of an indirection logic entry (190A, 190N) may identify the ledger entry that includes the indirection logic entry pointer that references the indirection logic entry (190A). The ledger entry identifier (192) may be any combination of letters, numbers, and/or symbols that uniquely identify the ledger entry.

In one or more embodiments of the invention, the local trust manager identifier(s) (194) specifies the local trust manager(s) that generated the trust data of the associated data (i.e., the corresponding data identified in the ledger entry (FIG. 1E, 184)). Each local trust manager identifier (194) may be any combination of letters, numbers, and/or symbols that uniquely identify the local trust manager.

In one or more embodiments of the invention, the local trust manager pointer(s) (196) are references to the local trust manager(s) specified in the local trust manager identifier(s) (194). The local trust manager pointer(s) (196) may be any type of reference that enables the client to access connection to the local trust manager(s). The local trust manager pointer(s) (196) may be, for example, a hyperlink, a URL, and/or any other type of reference without departing from the invention.

FIGS. 2A-2D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2D may be performed in parallel with any other steps shown in FIGS. 2A-2D.

Figure 2A:
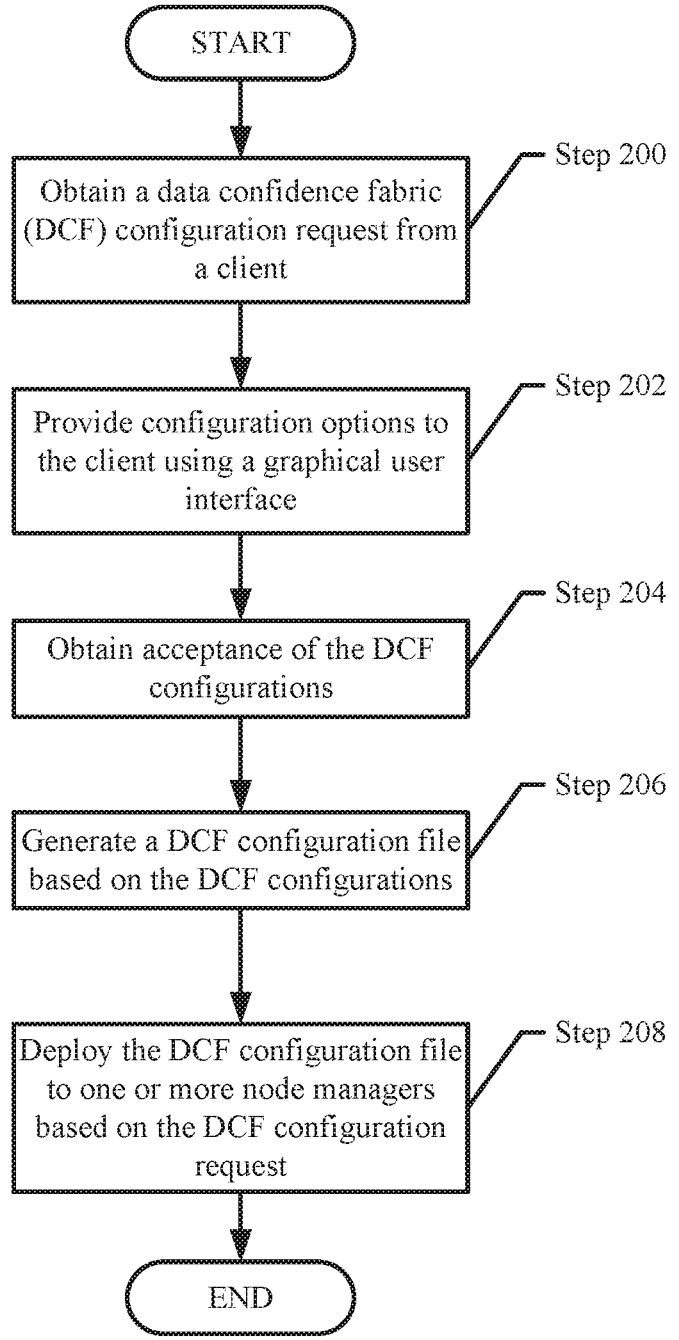
FIG. 2A shows a flowchart for managing data confidence fabric (DCF) configuration in accordance with one or more embodiments of the invention.

FIG. 2A shows a flowchart for managing data confidence fabric configuration in accordance with one or more embodiments of the invention. The method shown in FIG. 2A may be performed by, for example, data management system (100, FIG. 1A). Other components of the system illustrated in FIG. 1A may perform the method of FIG. 2A without departing from the invention.

Turning to FIG. 2A, in step 200, a DCF configuration request is obtained. In one or more embodiments of the invention, the DCF configuration request is obtained by a DCF configurator of the data management system. The DCF configuration request may specify a request to configure one or more DCF nodes. In one or more embodiments of the invention, the DCF configuration request is obtained from a client. The DCF configuration request may specify the type of data to be processed (e.g., traffic data, temperature data, audio, etc.). Alternatively, the DCF configuration request may specify one or more DCF nodes.

In step 202, configuration options are provided to the client using a graphical user interface. In one or more embodiments of the invention, the DCF configuration options specify the options for configuring the DCF nodes. The options may be for augmenting the data, modifying the data, and/or storing the data on a per-DCF node basis. The options may also enable the client to specify a DCF processing path using any combination of DCF nodes and the order in which the DCF nodes are to process the data. The DCF configuration options may be sent by the DCF configurator.

In one or more embodiments of the invention, the client (or a user using the client) makes a selection of the options using the GUI. The selection of the options may include all or a portion of the options provided by the data management system. The options may be displayed using categories based on the types of options for configuration. For example, a first category may be "Device Data" that displays options for configuring the type of data to be processed during data ingestion. A second category may be, for example, "Provenance Data" that displays options for configuring the generation of metadata associated with ingested data. This may also include signing the objects using a private key of the owner. A third category may be, for example, "Identity" that displays options for configuring the identification information of the obtained data. Additional categories may be displayed for additional options without departing from the invention.

In one embodiment of the invention, the GUI is provided to the client in response to the DCF configuration. In other words, the GUI is sent to the client to be used when selecting from the configuration options.

In one embodiment of the invention, access to the GUI is provided to the client. For example, a link (e.g., a hyperlink) to the GUI is sent to the client, and the GUI may be accessed by the client from the data management system.

Alternatively, the configuration options may be provided to the client using a non-graphical user interface such as, for example, a command line interface (CLI), application programming interfaces (APIs), or a hypertext transfer protocol (HTTP) interface. The client may communicate the selection using the corresponding non-graphical user interface.

In step 204, acceptance of the DCF configurations is obtained. In one or more embodiments of the invention, the acceptance includes the selection of the configuration options (which may also include information about the DCF processing path).

In step 206, a DCF configuration file(s) is generated based on the DCF configurations. In one or more embodiments of the invention, the DCF configuration file is generated by obtaining data structure that specifies the selection of options in a format that is readable by a DCF configuration daemon. The DCF configuration file may specify a DCF pipeline that specifies a process for modifying, augmenting, isolating, and/or storing data based on the selection of configuration options. The DCF configuration file may also specify the client that specified the DCF configurations. The DCF configuration file may be generated by the DCF configurator. The processing in step 206 may generate one DCF configuration file for a particular DCF node. However, if the configuration options specify a DCF processing path along with configuration operations for processing on each of the DCF nodes, then the processing step 206 includes generating multiple DCF configuration files—one per DCF node specified in the DCF processing path. Further, in addition to specifying the DCF pipeline for the DCF node (i.e., the DCF node that is to be configured using the DCF configuration file), the DCF configuration file may also specify: (i) the next DCF node in the DCF processing path; (ii) what data (which may be processed data) to send to the next DCF node in the DCF processing path; and (iii) information about how to send data (or otherwise communicate with) the next DCF node in the DCF processing path. The DCF configuration file may include additional and/or different information without departing from the invention.

In step 208, the DCF configuration file(s) is deployed to one or more node managers (which may be node manager on remote DCF nodes) based on the DCF configuration request. In one or more embodiments of the invention, the DCF configuration file is deployed using a push deployment mechanism that includes sending the configuration file as a virtual container to one or more node managers. The node managers may be specified in the DCF configuration file. Alternatively, the DCF configuration file may specify a type of data, and the DCF configurator may identify one or more node managers that obtain the type of data. The DCF configuration file may then be sent to the identified node managers.

In one or more embodiments of the invention, the DCF configuration file is deployed using a decentralized deployment mechanism. The decentralized deployment mechanism may include generating a configuration file identifier associated with the DCF configuration file and providing the configuration file identifier, along with a minimum set of information that may be used by the node managers to determine whether (or not) to request the DCF configuration file from all (or a portion) of the data management systems. Each node manager may determine whether to obtain the DCF configuration file from the data management system in response to receiving the configuration file identifier (and the aforementioned accompanying information). If a node manager determines that it should obtain the DCF, the node manager may send a request that specifies the confirmation file identifier to the data management system. The data management system subsequently sends the DCF configuration file to the node manager.

Figure 2B:
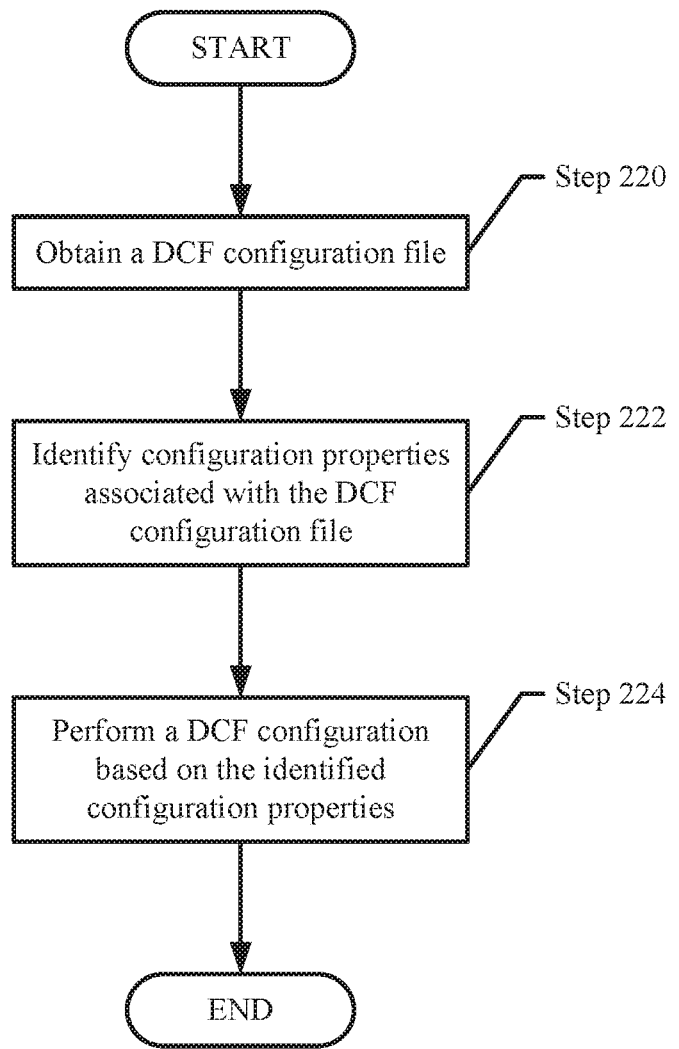
FIG. 2B shows a flowchart for configuring a node manager in accordance with one or more embodiments of the invention.

FIG. 2B shows a flowchart for configuring a node manager in accordance with one or more embodiments of the invention. The method shown in FIG. 2B may be performed by, for example, a node manager (160, FIG. 1C; 171, FIG. 1D). Other components of the system illustrated in FIG. 1A, FIG. 1C, or FIG. 1D may perform the method of FIG. 2B without departing from the invention.

In step 220, a DCF configuration file is obtained. In one or more embodiments of the invention, the DCF configuration file is obtained based on the deployment mechanism of the data management system (as described above).

In step 222, configuration properties associated with the DCF configuration file are identified. The configuration properties may be identified using a DCF configuration daemon of the node manager. In one or more embodiments of the invention, the configuration properties include each configuration options specified in the DCF configuration file. The DCF configuration daemon may analyze the DCF configuration file and identify each configuration property.

In one or more embodiments of the invention, each configuration property specifies a configuration for augmenting, modifying, isolating, and/or storing data obtained from one or more local data sources. The configuration property may specify the local data source and/or the type of data for which the node manager is to process the data.

In step 224, a DCF configuration is performed based on the identified configuration properties. In one or more embodiments of the invention, the configuration is performed by selecting an identified configuration property and configuring data ingestion manager to perform a process in accordance with the configuration property. For example, a configuration property may specify a digital signature to be generated for incoming traffic data. The DCF configuration daemon may configure the data ingestion manager to determine whether incoming data is traffic data and, if the incoming data is traffic data, to generate a signature of the incoming data. The process may be repeated for all identified configuration properties.

In one or more embodiments of the invention, the configuration is performed by generating a DCF pipeline based on the configuration properties. The DCF pipeline may be a process for processing incoming data in accordance with the configuration properties. The DCF pipeline may be associated with a type of data and/or a local data source. The DCF configuration daemon may subsequently configure the data ingestion manager to perform the DCF pipeline for associated data and/or associated local data sources.

Figure 2C:
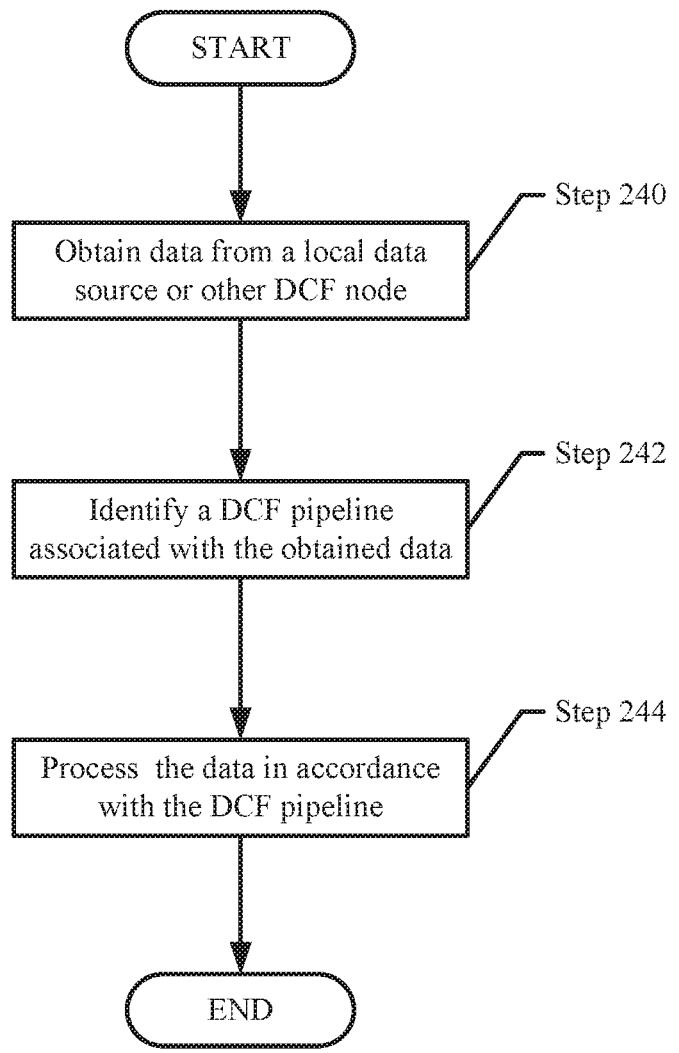
FIG. 2C shows a flowchart for performing data processing in accordance with one or more embodiments of the invention.

FIG. 2C shows a flowchart for performing data processing in accordance with one or more embodiments of the invention. The method shown in FIG. 2C may be performed by, for example, a node manager (160, FIG. 1C or 171, FIG. 1D). Other components of the system illustrated in FIG. 1A, FIG. 1C, or FIG. 1D may perform the method of FIG. 2C without departing from the invention.

In step 240, data is obtained from a local data source (if the node is a source DCF node) or from another DCF node (which may be a source DCF node or a non-source DCF node). The data may be obtained by data ingestion manager of the node manager. In other scenarios, step 240 may include receiving a reference to the data (which may or may not be processed) instead of the data itself. The reference may be to an object in an object store or a reference to an entry in a ledger service. Other references may be used without departing from the invention.

In step 242, a DCF pipeline that is identified is associated with the obtained data. In one or more embodiments of the invention, the data ingestion manager may identify a type of data of the data, the source of the data (e.g., the local data source), and/or any other characteristics of the data, and, using the aforementioned characteristics, identify a DCF pipeline that is associated with the data from the set of DCF pipelines in the DCF pipeline registry. For example, if the obtained data is an audio recording, the data ingestion manager may identify a DCF pipeline associated with audio data. In another example, the data may be for a specific local data source (e.g., data obtained from a specific IoT device). In this scenario, the DCF pipeline for the specific IoT device is selected.

In step 244, the data is processed and/or stored in accordance with the DCF pipeline(s). In one or more embodiments of the invention, the DCF pipeline performs the DCF pipeline to store the obtained data. The data ingestion manager may perform the process of the DCF pipeline in the specified order. In one or more embodiments of the invention, the process includes augmenting the data, modifying the data, isolating, and/or storing the data. The data ingestion manager may augment the data, modify the data, performs actions to isolate the data (creating a separate communication channel over which to transmit the data, encrypting the data, etc.) and/or store the data in accordance with the DCF pipeline.

In one embodiment of the invention, if the DCF node is part of a processing path that is associated with the data, then the DCF node may, as part of the processing: (i) send the data or processed data to a next DCF node in the DCF processing path; (ii) send a reference to the data (or processed data) to the next DCF node in the DCF processing path; and/or (iii) notify a next DCF node in the DCF processing path that the DCF node has finished processing the data.

The method shown in FIG. 2C may be performed each time data is received. Moreover, if multiple DCF pipelines are associated with the data (as specified in the DCF pipeline registry), the method shown in FIG. 2C may be performed multiple times on the same data with different DCF pipelines.

In one embodiment of the invention, if a DCF processing path is used to process data, then the data management system may include functionality to process a DCF processing path trace request for a given DCF processing path. The DCF processing path trace request may be sent by a client (or an application executing on a client). In response to the DCF processing path trace request, the data management system may provide the client (or application) with the following information: the DCF nodes in the DCF processing path, the IP address of each DCF node, the order in which the DCF nodes process the data, and information amount the processing that each DCF node performs. The data management system may provide additional or different information without departing from the invention.

Figure 2D:
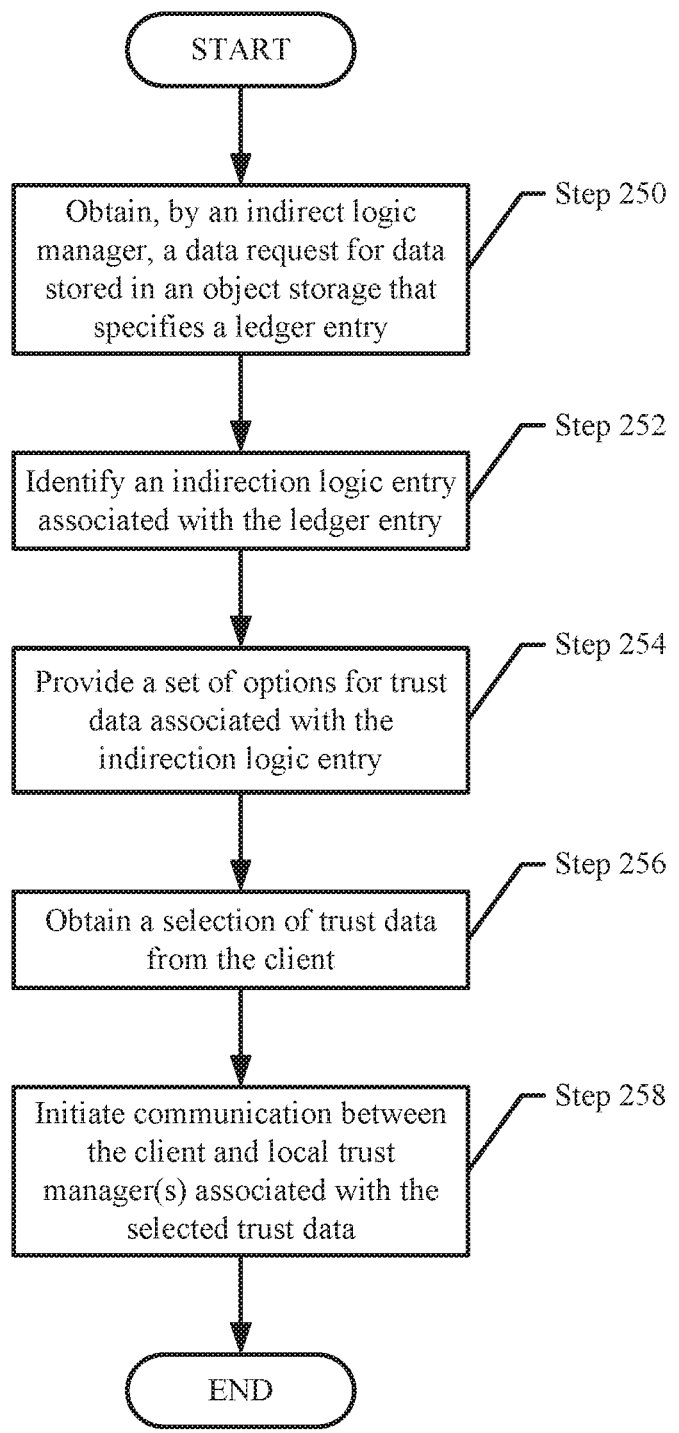
FIG. 2D shows a flowchart for servicing data requests in accordance with one or more embodiments of the invention.

FIG. 2D shows a flowchart for processing data requests in accordance with one or more embodiments of the invention. The method shown in FIG. 2D may be performed by, for example, an indirection logic service (136, FIG. 1A). Other components of the system illustrated in FIGS. 1A-1D may perform the method of FIG. 2D without departing from the invention.

In step 250, data request is obtained for one or more data stored in an object storage. In one or more embodiments of the invention, the data request is obtained from a client in response to selecting a ledger entry that specifies data that the client would like to access and using, directly or indirectly, the indirection logic entry pointer, which redirects the client to the indirection logic service. In one or more embodiments of the invention, the data request specifies an OID for data. The OID identifies a ledger entry that includes the OID and metadata of the trust data of the corresponding data.

In step 252, an indirection logic entry associated with the ledger entry is identified. In one or more embodiments of the invention, the indirection logic entry is identified using information included in the selected ledger entry (i.e., the ledger entry that initiated the redirection of the client to the indirection logic service).

In step 254, a set of options for trust data specified in the ledger entry is provided to the client. In one or more embodiments of the invention, as discussed in FIG. 1F, the indirection logic entry may include any number of local trust manager identifiers. The local trust manager identifiers may specify local trust manager identifiers corresponding to the local trust managers that were involved in generation of the trust metadata associated with the data specified in the ledger entry.

In one or more embodiments of the invention, the set of options specify the type of trust data that was generated by the local trust managers. Further, the set of options may specify the DCF nodes associated with generating each type of trust data. For example, the data may be encrypted by DCF node A and compressed by DCF node B. The set of options may specify the encryption algorithm and the compression algorithm performed on the data. The set of options may further specify DCF node A as having performed the encryption algorithm and DCF node B as having performed the compression algorithm.

In one or more embodiments of the invention, the set of options is provided to the client using the GUI discussed in FIG. 1A. The client (or a user using the client) makes a selection of the set of options using the GUI. The selection of the options may include all or a portion of the options provided by the indirection logic service.

In one embodiment of the invention, the GUI is provided to the client in response to the data request. In other words, the GUI is sent to the client to be used when selecting from the set of options.

In one embodiment of the invention, access to the GUI is provided to the client. For example, a link (e.g., a hyperlink) to the GUI is sent to the client, and the GUI may be accessed by the client from the indirection logic service or the corresponding data management system of the DCF nodes.

Alternatively, the set of options may be provided to the client using a non-graphical user interface such as, for example, a command line interface (CLI), application programming interfaces (APIs), or a hypertext transfer protocol (HTTP) interface. The client may communicate the selection using the corresponding non-graphical user interface.

In step 256, a selection of trust data is obtained from the client. In one or more embodiments of the invention, the selection of trust data includes the selection of all or a portion of the set of options provided to the client.

In step 258, communication between the client and one or more local trust managers are provided to the client based on the selection. In one or more embodiments of the invention, the indirection logic service identifies the local trust managers associated with the selected trust data using the indirection logic entry and provides the client at least one of the local trust manager pointers of the local trust managers.

In one or more embodiments of the invention, the indirection logic service provides all local trust manager pointers of all local trust managers of the selected trust data. In such manner, the client may communicate with each local trust managers of the selected trust data to negotiate terms for accessing the data and the corresponding trust data.

In one or more embodiments of the invention, the communication initiated in step 258 includes sending one local trust manager pointer of the local trust manager pointers to initiate communication with one local trust manager. In such embodiment, the client may negotiate the terms for each trust data of the local trust managers with the one local trust manager. The local trust manager may forward the negotiated terms to the other local trust managers of the selected trust data to allow the other local trust managers to take part in the negotiation process. In such manner, the network traffic between the client and the DCF nodes is minimized by reducing the communication to one local trust manager.

In one or more embodiments of the invention, after the communication between the client and the local trust manager(s) is initiated, the client and the local trust managers of the selected trust data may agree on terms for accessing the data (including pricing, periods of time for providing the data, etc.). The acceptance may be memorialized in a smart contract (as discussed above). The acceptance of terms may result in a license agreement. The license agreement may be stored in the indirection logic service (or another third party distributed transaction ledger). The result of such agreement may include providing access of the data and/or the selected trust data to the client.

Once the terms are accepted, access between the client and the object storage (or one or more DCF nodes) that store the data and/or the trust data is initiated. In one or more embodiments of the invention, the access is initiated by sending the client credential information (e.g., a username and a password) that allows the client to access agreed-upon data stored in the object storage (or DCF nodes). The access may be further initiated by sending the accepted terms to the DCF nodes. The accepted terms may specify the credential information sent to the client and the agreed-upon data to be accessed by the client.

In one or more embodiments of the invention, the access is initiated by sending the client information for how to access the data in the DCF nodes or object storage. The information may be, for example, a connection path that connects the client to a local trust manager of the DCF nodes. Other methods for facilitating access to the object storage or the relevant DCF nodes by the client may be used without departing from the invention.

EXAMPLE

The following section describes an example. The example, illustrated in FIGS. 3A-3D, is not intended to limit the invention. Turning to the example and referring to FIG. 3A, consider a scenario in which there is a DCF processing path in DCF A (308) that includes the following DCF nodes: DCF node A (300), DCF B (302), DCF Node C (304), and DCF Node D (306). Each of the aforementioned DCF nodes is configured in accordance with FIGS. 2A-2C. Accordingly, data processed by DCF node A (300) is provided to DCF node B (302) [1]; the data is then processed by DCF node B (302) and provided to DCF node C (304) [2]; and finally, the data is then processed by DCF node C (304) and provided to DCF node D (306) [3]. The processing of the data includes generating trust data by local trust managers (not shown) in each DCF node (300, 302, 304, 306). Specifically, DCF node A (300) generates provenance metadata that specifies the owner of the data; DCF node A (302) hashes the data to generate hashed values; DCF node C (304) compresses the data to generate compressed data; and DCF node D (306) generates timestamps for the now processed data.

Figure 3A:
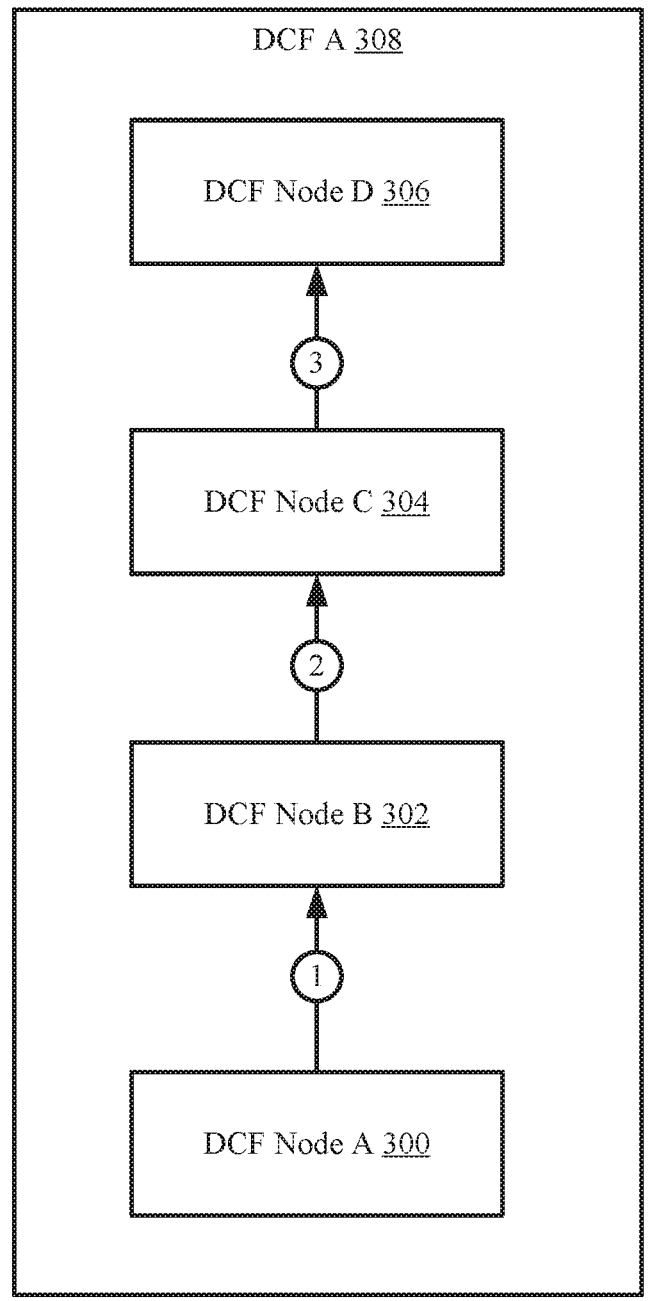
FIGS. 3A-3C show an example in accordance with one or more embodiments of the invention.
Figure 3B:
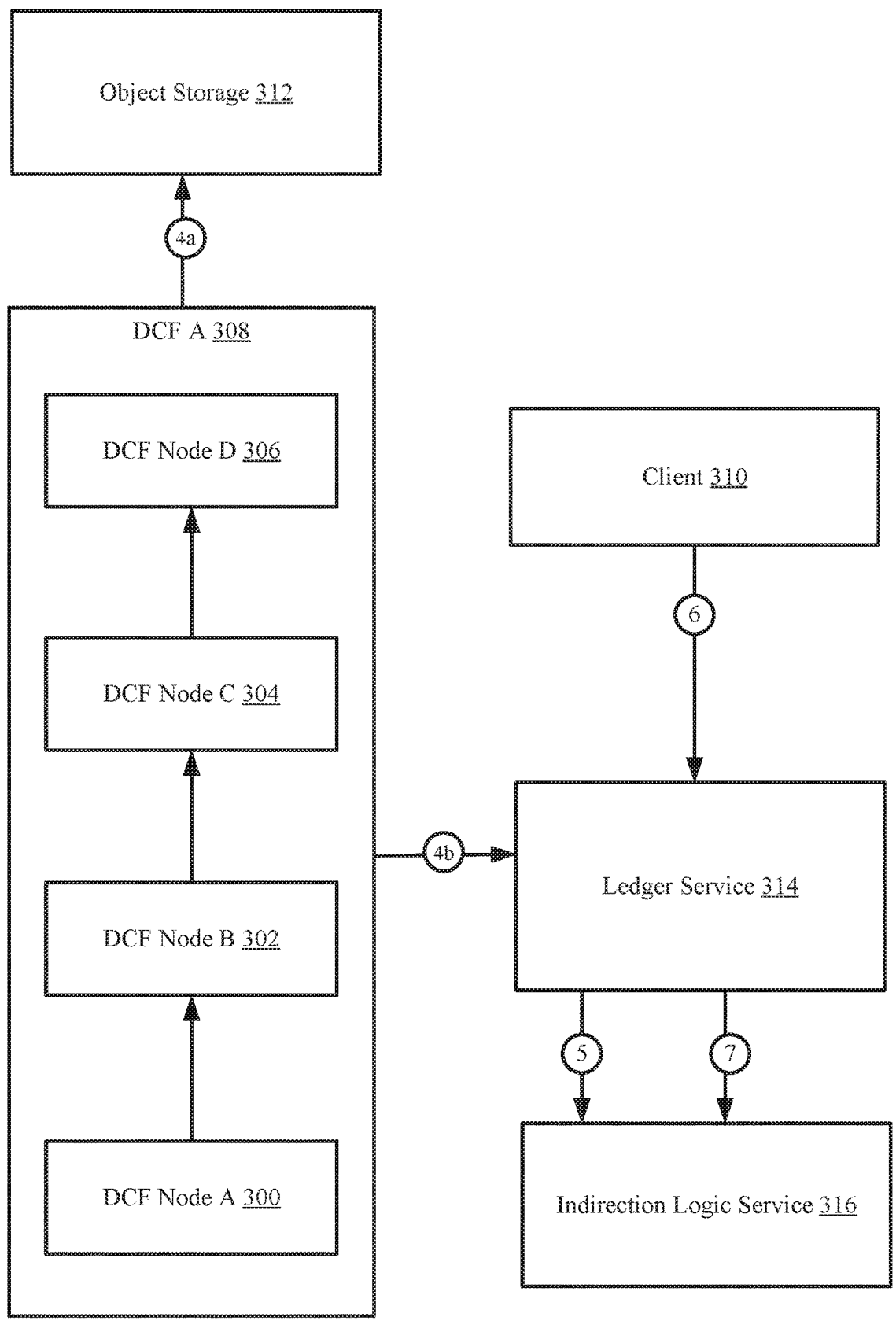

Referring to FIG. 3B, at a later point in time, DCF node D (306) stores the processed data and the generated trust data (e.g., the provenance metadata, the hash value, and the timestamps), in an object storage (312) [4a]. Further, a ledger entry is generated that includes an object identifier of the processed data and data trust metadata that specifies the type of trust data (e.g., compression, provenance metadata, hash values, and a timestamp) generated for the processed data. The ledger entry is stored in the ledger service (316) [4b].

The generation of the ledger entry (314) results in generation of an indirection logic entry stored in the indirection logic service (316) [5]. The indirection logic entry may specify the DCF nodes (300, 302, 304, 306) involved in generating the aforementioned trust data.

At a later point in time, a client (310) may browse the ledger service (314) [6] to identify the data processed in FIG. 3A. The client, being able to see the data trust metadata, selects the ledger entry that specifies the data. The ledger entry includes an indirection logic entry pointer that references the indirection logic entry. The client is redirected to the indirection logic service (316) via the indirection logic entry pointer [7].

Figure 3C:
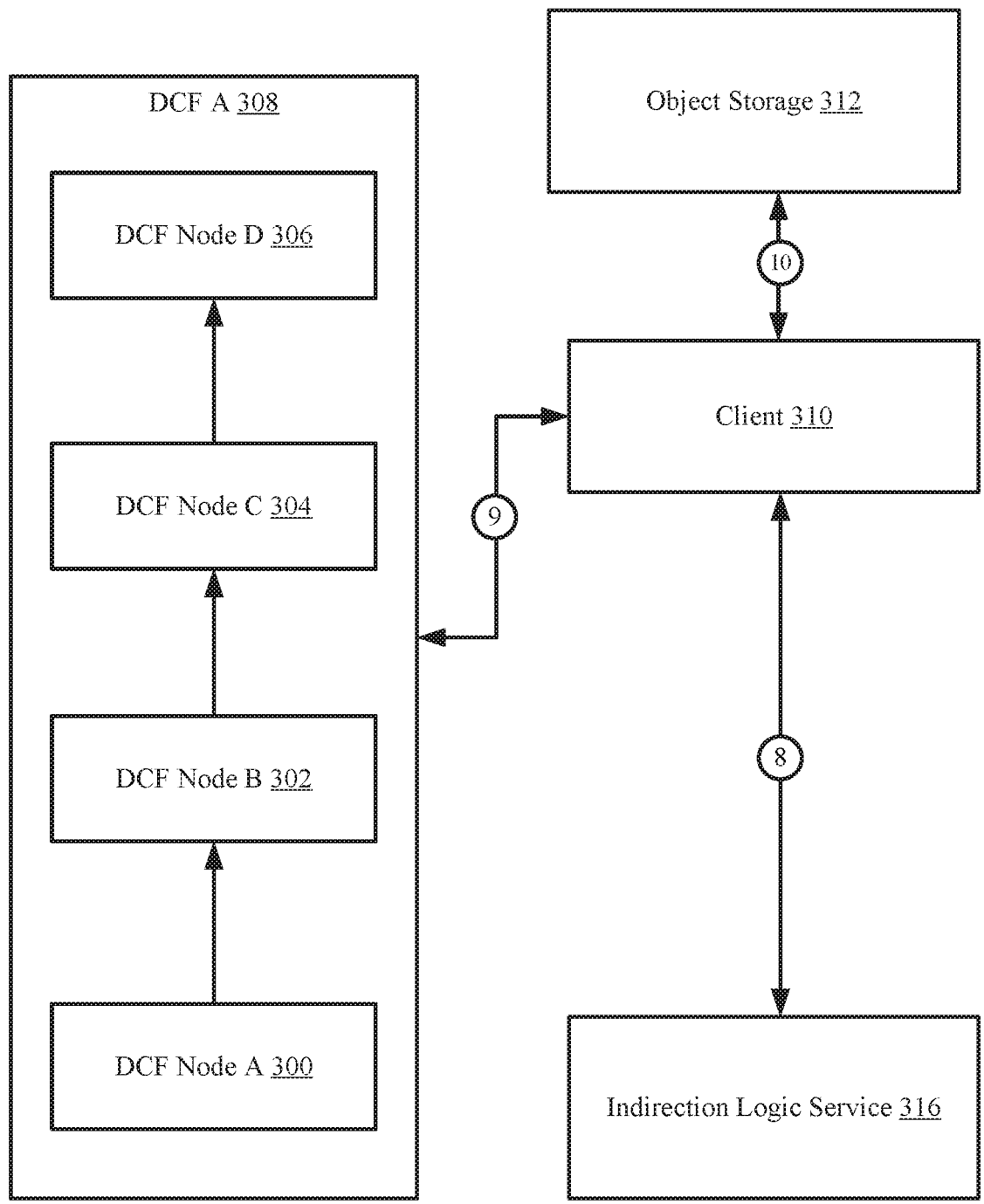

Referring to FIG. 3C, at a later point, the indirection logic service (316) identifies the corresponding indirection logic entry of the indirection logic entry pointer and provides a set of options based on the indirection logic entry for the trust data that the client (310) would like to access [8]. The client, in response to receiving the set of options, makes a selection for the desired trust data. The client selects accessing the hash value, which may be used to verify that the data has not been altered since storage, and the provenance metadata. The selection is provided to the indirection logic service (316). The indirection logic service (316) provides the local trust manager pointers of the selected trust data (i.e., pointers for DCF nodes A and B (300, 302)) to the client (310) to initiate communication between the client (310) and the corresponding DCF nodes (300, 302).

The client (310), via the local trust manager pointers, is redirected to DCF nodes A and B (300, 302) of DCF A (308) [9]. The client negotiates terms for accessing the processed data and the corresponding trust data of each DCF node (300, 302). After the terms are agreed and the transaction is stored as a smart contract in a distributed transaction ledger (as discussed in FIG. 2D) of the indirection logic service (316), the client (310) obtains access to the processed data and the selected trust data (312) [10].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of providing data to a client from, e.g., IoT by managing data confidence fabric between the client and the internet of things devices. The data confidence fabric is managed by configuring devices that obtain the data to perform specified processes, at the time of ingest, to the data that increase the reliability in using the data. The processed may increase the reliability of the data by augmenting the data to include additional information that may further specify where the data comes from and/or how the data was obtained. In this manner, the client may rely on the additional information to determine a confidence in using the data for application purposes.

Further, embodiments of the invention allow local trust managers generating the processed data to receive compensation for the additional reliability of the data due in part by the local trust managers. Embodiments of the invention allow such compensation by generating an indirection logic service that serves as a mid-point between the clients that would like to access the data and the data itself. Embodiments of the invention provide communication between the client and the local trust manager that enable the local trust manager to receive financial compensation from the client for the requested trust data.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
    obtaining, by an indirection logic service, a data request for data,
        wherein the data request specifies a ledger entry,
        wherein the data is generated by a data confidence fabric (DCF) comprising a plurality of DCF nodes;
    identifying an indirection logic entry stored in the indirection logic service based on the ledger entry,
        wherein the ledger entry comprises an indirection logic entry pointer corresponding to the indirection logic entry,
        wherein the data request is obtained in response to accessing the indirection logic entry by a client;
    obtaining a selection of trust data from the client,
        wherein the ledger entry further comprises metadata of the trust data,
        wherein the selection is based on a set of options of the trust data provided to the client,
        wherein the trust data specifies at least one of: an owner of the data, a geographical location associated with the data, and a cryptographical technique applied to the data; and
    initiating communication between the client and a local trust manager of a DCF node of the plurality of DCF nodes based on the selection of trust data, wherein the trust data was generated by the local trust manager.

2. The method of claim 1, further comprising:
    prior to obtaining the selection of trust data, providing a set of options for trust data, wherein the set of options for trust data comprises at least the selection of trust data.

3. The method of claim 1, wherein the trust data is not accessed by the client until after the communication for agreement of terms is initiated.

4. The method of claim 1, wherein the trust data is stored in the DCF node.

5. The method of claim 4, wherein initiating the communication between the client and the local trust manager comprises sending a pointer to the client that allows the client to access communication with the local trust manager.

6. The method of claim 5, wherein the client accesses the trust data based on the communication.

7. A non-transitory computer readable medium comprising computer readable program code, which when executed by a computer processor enables the computer processor to perform a method, the method comprising:
    obtaining, by an indirection logic service, data request for data,
        wherein the data request specifies a ledger entry,
        wherein the data is generated by a data confidence fabric (DCF) comprising a plurality of DCF nodes;
    identifying an indirection logic entry stored in the indirection logic service based on the ledger entry,
        wherein the ledger entry is stored in a ledger service,
        wherein the ledger entry comprises an indirection logic entry pointer corresponding to the indirection logic entry,
        wherein the data request is obtained in response to accessing the indirection logic entry by a client;
    obtaining a selection of trust data from the client,
        wherein the ledger entry comprises metadata of the trust data,
        wherein the selection is based on a set of options of the trust data provided to the client,
        wherein the trust data specifies at least one of: an owner of the data, a geographical location associated with the data, and a cryptographical technique applied to the data; and
    initiating communication between the client and a local trust manager of a DCF node of the plurality of DCF nodes based on the selection of trust data, wherein the trust data was generated by the local trust manager.

8. The non-transitory computer readable medium of claim 7, the method further comprising:
    prior to obtaining the selection of trust data, providing a set of options for trust data, wherein the set of options for trust data comprises at least the selection of trust data.

9. The non-transitory computer readable medium of claim 7, wherein the trust data is not accessed by the client until after the communication for agreement of terms is initiated.

10. The non-transitory computer readable medium of claim 7, wherein the trust data is stored in the DCF node.

11. The non-transitory computer readable medium of claim 7, wherein initiating the communication between the client and the local trust manager comprises sending a pointer to the client that allows the client to access communication with the local trust manager.

12. The non-transitory computer readable medium of claim 11, wherein the client accesses the trust data based on the communication.

13. A system, comprising:
    a processor; and
    memory comprising instructions, which when executed by the processor, perform a method, the method comprising:
        obtaining, by an indirection logic service, data request for data,
            wherein the data request specifies a ledger entry,
            wherein the data is generated by a data confidence fabric (DCF) comprising a plurality of DCF nodes;
        identifying an indirection logic entry stored in the indirection logic service based on the ledger entry,
            wherein the ledger entry is stored in a ledger service,
            wherein the ledger entry comprises an indirection logic entry pointer corresponding to the indirection logic entry,
            wherein the data request is obtained in response to accessing the indirection logic entry by a client;
        obtaining a selection of trust data from the client,
            wherein the ledger entry comprises metadata of the trust data,
            wherein the selection is based on a set of options of the trust data provided to the client,
            wherein the trust data specifies at least one of: an owner of the data, a geographical location associated with the data, and a cryptographical technique applied to the data; and
        initiating communication between the client and a local trust manager of a DCF node of the plurality of DCF nodes based on the selection of trust data, wherein the trust data was generated by the local trust manager.

14. The system of claim 13, the method further comprising:
prior to obtaining the selection of trust data, providing a set of options for trust data, wherein the set of options for trust data comprises at least the selection of trust data.

15. The system of claim 13, wherein the trust data is not accessed by the client until after the communication for agreement of terms is initiated.

16. The system of claim 13, wherein the local trust manager is executing on a DCF node.

17. The system of claim 13, wherein initiating the communication between the client and the local trust manager comprises sending a pointer to the client that allows the client to access communication with the local trust manager.

\* \* \* \* \*